(12) United States Patent
Cheon

(10) Patent No.: US 10,087,757 B2
(45) Date of Patent: Oct. 2, 2018

(54) INTAKE DEVICE, POWER GENERATOR, EXTERNAL COMBUSTION SYSTEM USING INTAKE DEVICE AND POWER GENERATOR, INTERNAL COMBUSTION SYSTEM USING INTAKE DEVICE AND POWER GENERATOR, AND AIR HYBRID POWER GENERATION SYSTEM USING INTAKE DEVICE AND POWER GENERATOR

(71) Applicant: Jung Sik Cheon, Seoul (KR)

(72) Inventor: Jung Sik Cheon, Seoul (KR)

( * ) Notice: Subject to any disclaimer, the term of this patent is extended or adjusted under 35 U.S.C. 154(b) by 211 days.

(21) Appl. No.: 15/305,282

(22) PCT Filed: Apr. 21, 2015

(86) PCT No.: PCT/KR2015/003952
§ 371 (c)(1),
(2) Date: Oct. 19, 2016

(87) PCT Pub. No.: WO2015/163661
PCT Pub. Date: Oct. 29, 2015

(65) Prior Publication Data
US 2017/0037726 A1 Feb. 9, 2017

(30) Foreign Application Priority Data

Apr. 21, 2014 (KR) .................. 10-2014-0047472
Nov. 19, 2014 (KR) .................. 10-2014-0161579

(51) Int. Cl.
*F01B 17/04* (2006.01)
*F01B 29/12* (2006.01)
(Continued)

(52) U.S. Cl.
CPC .............. *F01B 17/04* (2013.01); *F01B 29/12* (2013.01); *F01C 1/00* (2013.01); *F01C 9/00* (2013.01);
(Continued)

(58) Field of Classification Search
CPC .. F02B 53/00; F02B 2730/03; F02B 2730/01; F02B 2730/015; F04C 18/00;
(Continued)

(56) References Cited

U.S. PATENT DOCUMENTS 1,333,399 A * 3/1920 Erickson ................. F02B 53/00
123/206
1,378,897 A * 5/1921 Peterson ................. F02B 53/00
123/248

(Continued)

FOREIGN PATENT DOCUMENTS

FR       448222 A * 1/1913  .............. F02B 53/00
GB       446284 A * 4/1936  ............ F01C 1/3568
(Continued)

OTHER PUBLICATIONS

International Search Report dated Jun. 4, 2015 issued in PCT/KR2015/003952, 4 pages.

*Primary Examiner* — Mark Laurenzi
*Assistant Examiner* — Xiaoting Hu
(74) *Attorney, Agent, or Firm* — Scully Scott Murphy & Presser

(57) ABSTRACT

An exemplary embodiment of the present disclosure provides an intake device including: an annular flow path which is formed in a circular housing; an inlet part which is installed at one side of the housing and guides an inflow of a fluid into the flow path; a outlet part which is installed at the other side of the housing and guides a discharge of the fluid which flows into the inlet part and passes through the flow path; a piston which is disposed in the flow path, and rotates along the flow path so as to compress the fluid introduced through the inlet part; and an opening and closing unit which is installed in the flow path between the inlet part and the outlet part, includes a plurality of opening and closing members, and elastic members which are installed (Continued)

between the plurality of opening and closing members and the flow path so as to support the plurality of opening and closing members, respectively, and opens and closes the flow path by pressing the piston, in which when the pressing of the piston is released, the plurality of opening and closing members closes the flow path by pressing force of the fluid which presses outer circumferential surfaces of the plurality of opening and closing members in a direction in which the flow path is closed, and by elastic force of the elastic member.

15 Claims, 13 Drawing Sheets

(51) Int. Cl.
| | | |
|---|---|---|
| F01C 1/00 | (2006.01) | |
| F01C 9/00 | (2006.01) | |
| F01C 11/00 | (2006.01) | |
| F02B 53/02 | (2006.01) | |
| F02B 55/00 | (2006.01) | |
| F04C 11/00 | (2006.01) | |
| F04C 18/00 | (2006.01) | |
| F04C 23/00 | (2006.01) | |
| F01C 20/00 | (2006.01) | |
| F04C 28/00 | (2006.01) | |
| F01K 3/00 | (2006.01) | |
| F02B 55/14 | (2006.01) | |

(52) U.S. Cl.
CPC ............ *F01C 11/004* (2013.01); *F01C 20/00* (2013.01); *F01K 3/00* (2013.01); *F02B 53/02* (2013.01); *F04C 11/003* (2013.01); *F04C 18/00* (2013.01); *F04C 23/003* (2013.01); *F04C 28/00* (2013.01); *F02B 55/00* (2013.01); *F02B 55/14* (2013.01); *F02B 2730/01* (2013.01); *F02B 2730/011* (2013.01); *F02B 2730/015* (2013.01); *F02B 2730/03* (2013.01); *Y02T 10/17* (2013.01)

(58) Field of Classification Search
CPC .. F04C 18/14; F04C 18/20; F04C 3/02; F04C 18/50; F04C 11/003; F04C 23/003; F01C 11/004; F01C 3/02
USPC .................................................. 418/177, 195
See application file for complete search history.

(56) References Cited

U.S. PATENT DOCUMENTS

| | | | | |
|---|---|---|---|---|
| 1,955,461 | A * | 4/1934 | Hickerson | F02B 53/00 123/226 |
| 2,760,466 | A * | 8/1956 | Black, Jr. | F01C 1/063 123/203 |
| 4,076,471 | A * | 2/1978 | McClure | F01C 1/46 137/624.17 |
| 4,451,214 | A * | 5/1984 | Kagamiyama | F01C 1/46 418/11 |
| 5,046,465 | A * | 9/1991 | Yi | F01C 1/356 123/248 |
| 5,242,288 | A * | 9/1993 | Vincent | F01C 1/46 418/223 |
| 6,276,329 | B1 * | 8/2001 | Archer | F01C 3/02 123/228 |
| 2005/0263129 | A1 * | 12/2005 | Wright | F01C 3/02 123/233 |
| 2009/0120406 | A1 * | 5/2009 | Lindsey | F01C 3/02 123/204 |

FOREIGN PATENT DOCUMENTS

| | | |
|---|---|---|
| JP | H07-317560 A | 12/1995 |
| JP | H08-128394 A | 5/1996 |
| JP | 2000-054801 A | 2/2000 |

* cited by examiner

[Fig. 1]
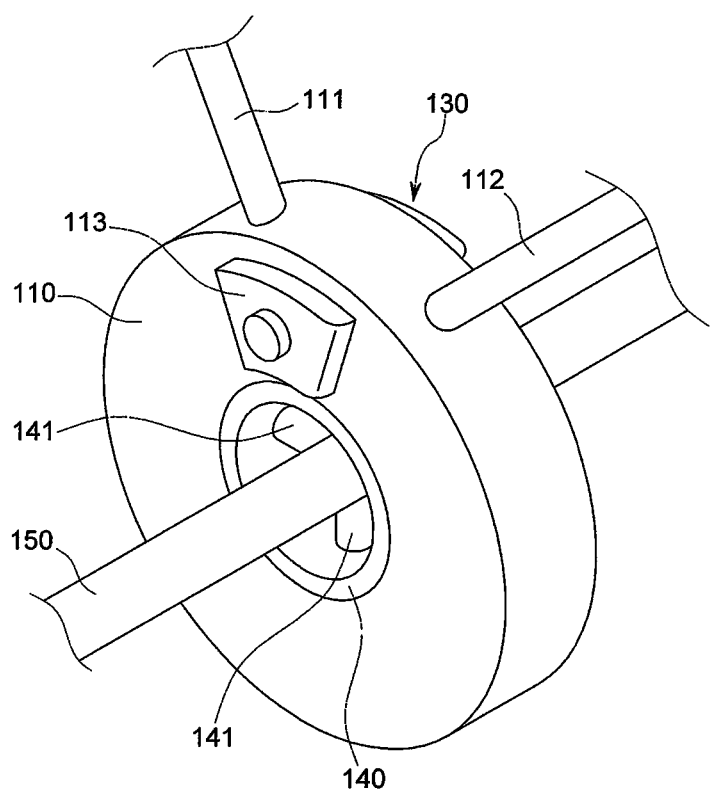

[Fig. 2]
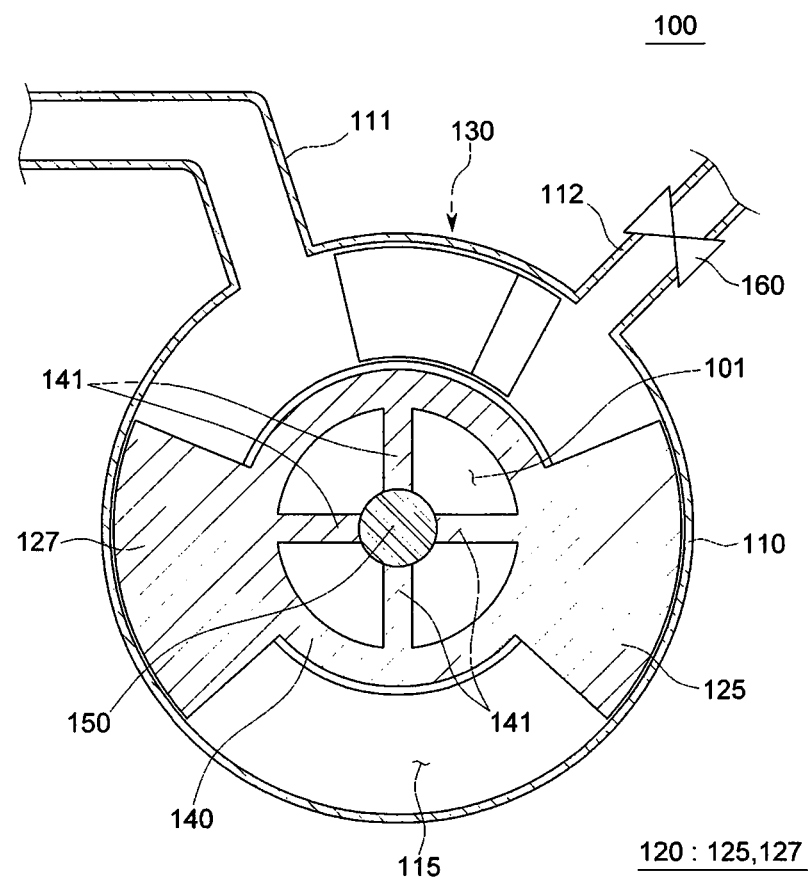

【Fig. 3】
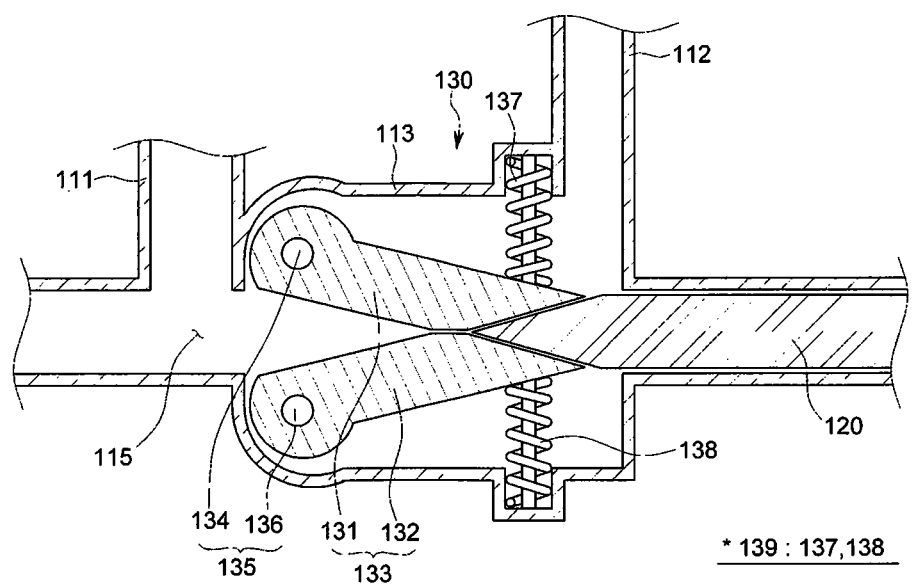

[Fig. 4]
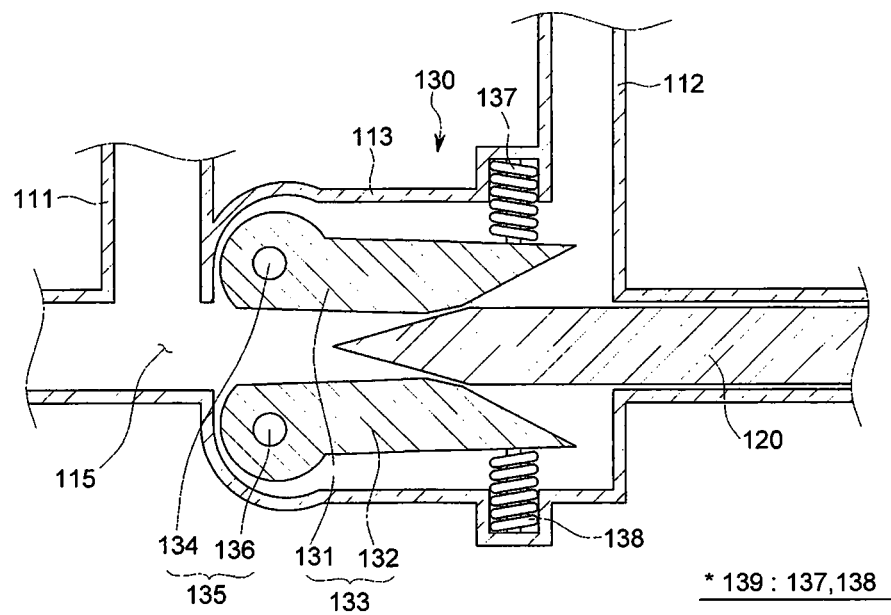

[Fig. 5]
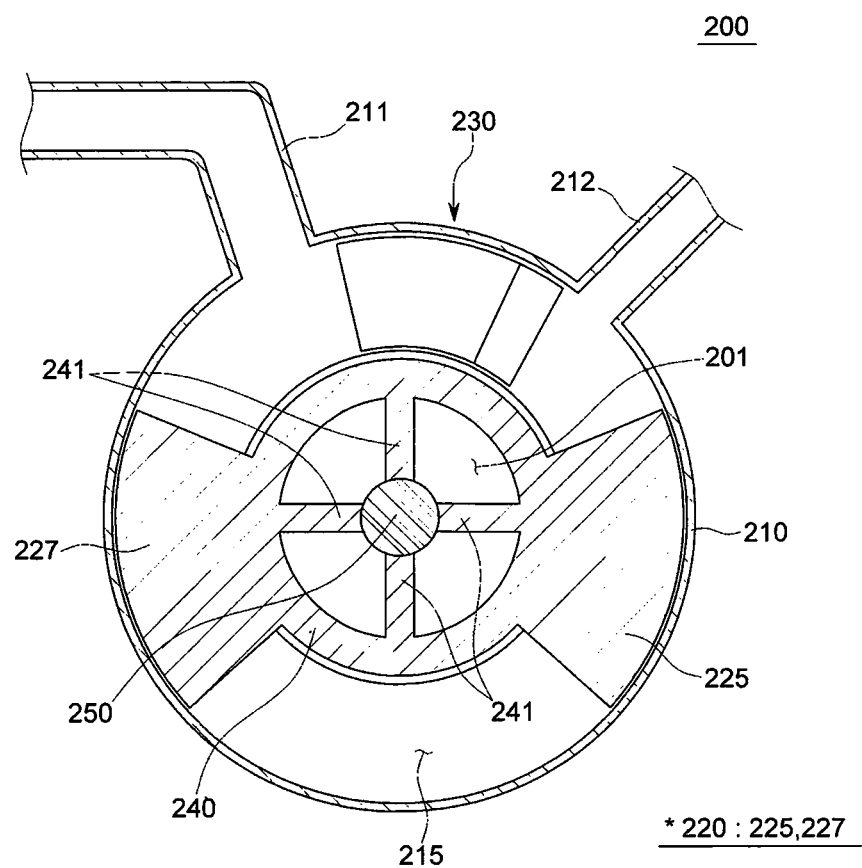

[Fig. 6]
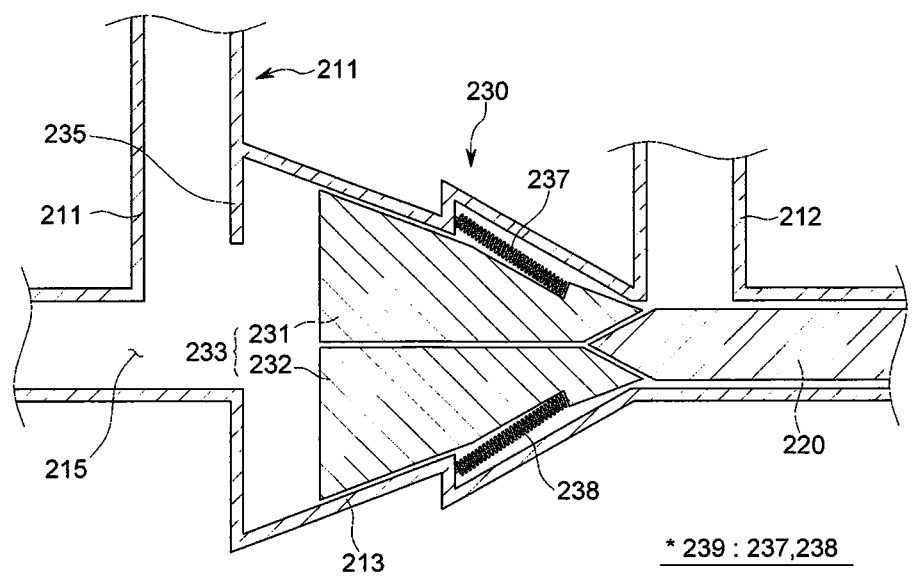

[Fig. 7]
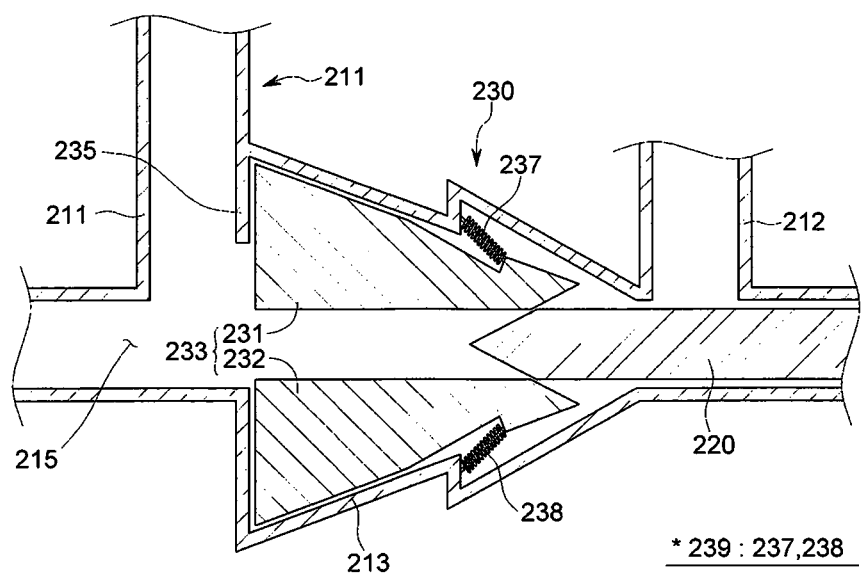

[Fig. 8]
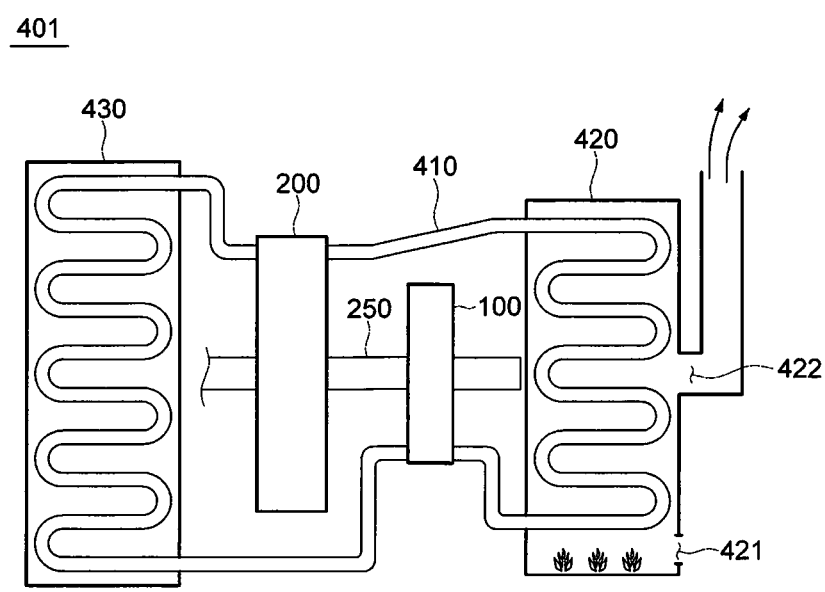

[Fig. 9]
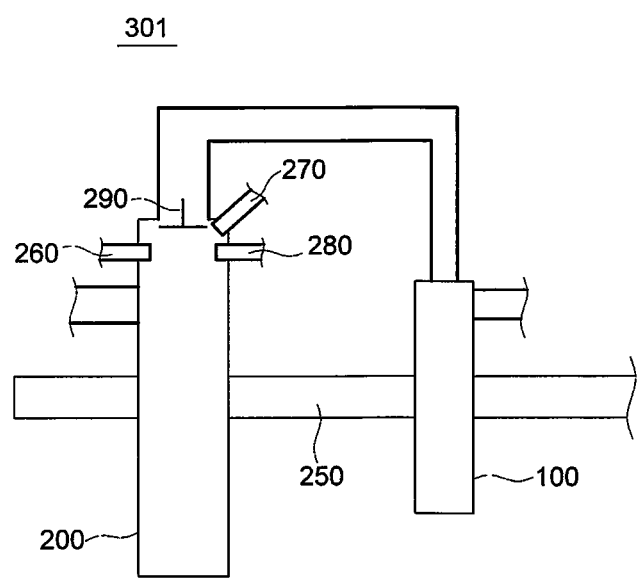

[Fig. 10]
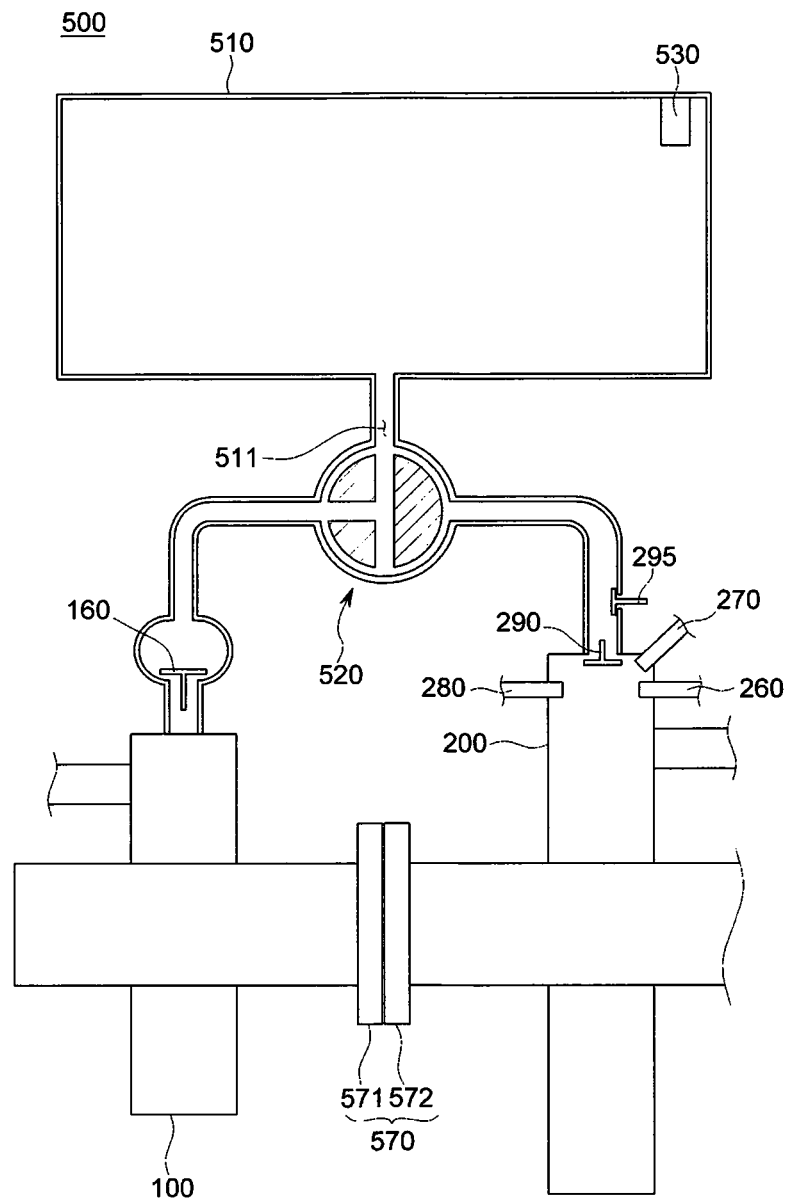

[Fig. 11]
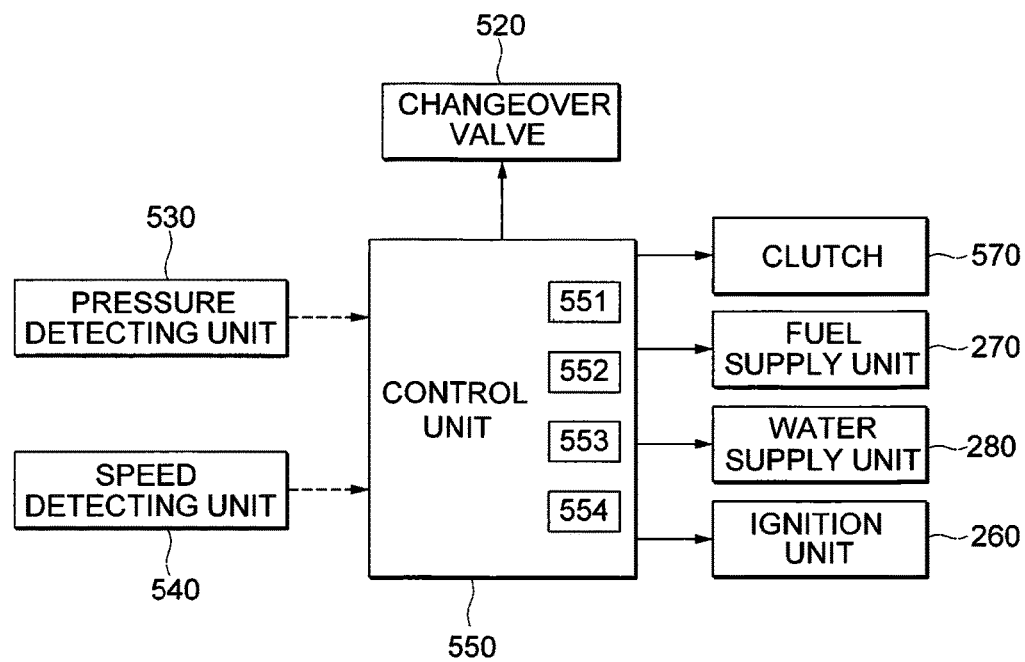

[Fig. 12]
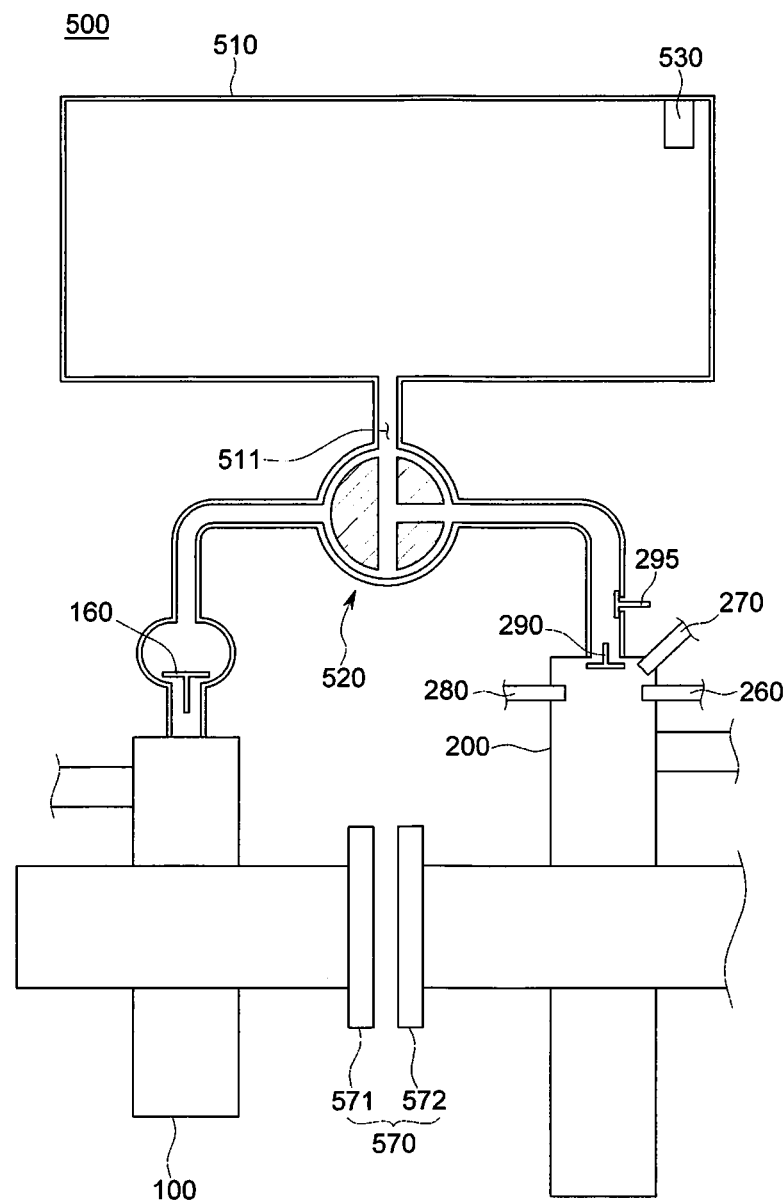

[Fig. 13]
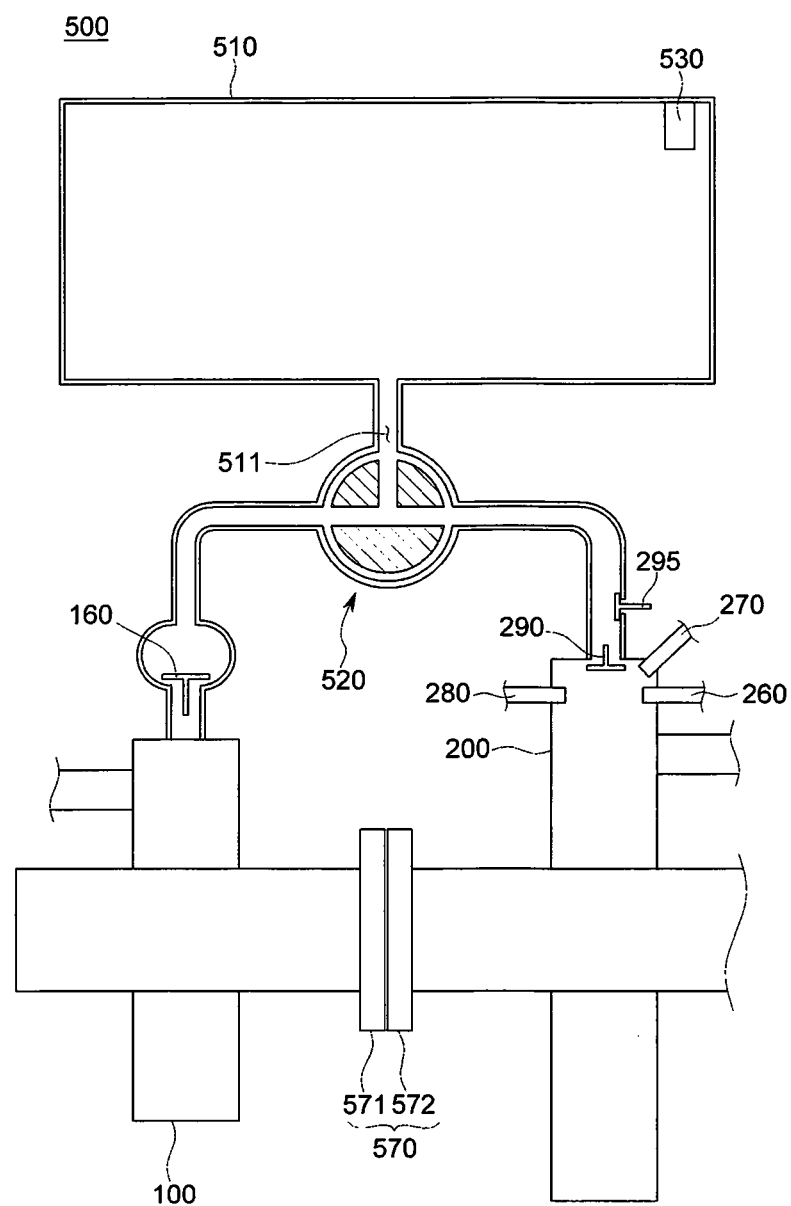

INTAKE DEVICE, POWER GENERATOR, EXTERNAL COMBUSTION SYSTEM USING INTAKE DEVICE AND POWER GENERATOR, INTERNAL COMBUSTION SYSTEM USING INTAKE DEVICE AND POWER GENERATOR, AND AIR HYBRID POWER GENERATION SYSTEM USING INTAKE DEVICE AND POWER GENERATOR

TECHNICAL FIELD

An exemplary embodiment of the present disclosure relates to an intake device, a power generator, and a power system using the intake device and the power generator, and more particularly, to an intake device and a power generator, which each include a piston that moves along an annular flow path inside a circular housing, and a power system using the intake device and the power generator.

BACKGROUND ART

In general, an intake device is coupled to a separate motor or the like, and introduces or presses a fluid. The intake device is required to have valves which are opened and closed to introduce and discharge the fluid into and from the intake device, and a crank shaft.

However, there are problems in that a structure of the intake device is complicated because the structure includes a valve for opening and closing an inflow of the fluid and a valve for opening and closing a discharge of the fluid, and efficiency deteriorates due to a mechanical loss because a rotational motion is converted into a rectilinear reciprocating motion of a piston through the crank shaft.

In general, the power generator has a complicated structure such as a crank shaft, an intake valve and an exhaust valve which each open and close an intake port and an exhaust port.

Therefore, there is a problem in that efficiency deteriorates due to a mechanical loss because the rectilinear reciprocating motion of the piston is transmitted as a rotational motion through the crank shaft.

In addition, a power system using the intake device and the power generator has a problem in that efficiency deteriorates because of the intake device and the power generator having the complicated structures.

DISCLOSURE

Technical Problem

Exemplary embodiments of the present disclosure may provide an intake device which has a simple structure and introduces a fluid through a rotational motion, a power generator which may effectively produce power by the rotation of a piston that moves along an annular flow path, and a power system using the intake device and the power generator.

Technical Solution

An exemplary embodiment of the present disclosure provides an intake device including: an annular flow path which is formed in a circular housing; an inlet part which is installed at one side of the housing and guides an inflow of a fluid into the flow path; a outlet part which is installed at the other side of the housing and guides a discharge of the fluid which flows into the inlet part and passes through the flow path; a piston which is disposed in the flow path, and rotates along the flow path so as to compress the fluid introduced through the inlet part; and an opening and closing unit which is installed in the flow path between the inlet part and the outlet part, includes a plurality of opening and closing members, and elastic members which are installed between the plurality of opening and closing members and the flow path so as to support the plurality of opening and closing members, respectively, and opens and closes the flow path by pressing the piston, in which when the pressing of the piston is released, the plurality of opening and closing members closes the flow path by pressing force of the fluid which presses outer circumferential surfaces of the plurality of opening and closing members in a direction in which the flow path is closed, and by elastic force of the elastic member.

In addition, the opening and closing unit may further include hinge shafts that allow the plurality of opening and closing members to be rotated based on one side thereof so as to be away from each other when the plurality of opening and closing members opens the flow path.

In addition, the piston may include: a first piston which moves along the flow path; and a second piston which moves along the flow path while having a phase difference of 180 degrees with the first piston.

Another exemplary embodiment of the present disclosure provides a power generator including: a circular power generation housing which has a hollow portion formed at a center thereof; an annular fluid flow path which is formed in the power generation housing; a fluid inlet part which is installed at one side of the power generation housing and guides an inflow of a fluid into the fluid flow path; a fluid outlet part which is installed at the other side of the power generation housing and guides a discharge of the fluid which flows into the fluid inlet part and passes through the fluid flow path; a power piston which is disposed in the fluid flow path, and rotates along the fluid flow path by the fluid introduced through the fluid inlet part; a shaft which penetrates the hollow portion of the power generation housing, and is connected with the power piston so as to rotate together with the power piston when the power piston rotates; and a flow path opening and closing unit which is installed in the fluid flow path between the fluid inlet part and the fluid outlet part, and includes a plurality of flow path opening and closing members, elastic bodies that are installed between the plurality of flow path opening and closing members and the fluid flow path and support the plurality of flow path opening and closing members, respectively, and a catching projection that inhibits the plurality of flow path opening and closing members from sliding in the movement direction of the power piston, in which the plurality of flow path opening and closing members opens the fluid flow path by moving away from each other while sliding in the movement direction of the power piston by pressing force of the power piston, and when pressing force of the power piston is released, the plurality of flow path opening and closing members closes the fluid flow path by pressing force of the fluid between the plurality of flow path opening and closing members and the catching projection in a direction in which the fluid flow path is closed, and by elastic force of the elastic bodies.

In addition, the power piston may include: a first power piston which moves along the fluid flow path; and a second power piston which moves along the fluid flow path while having a phase difference of 180 degrees with the first power piston.

Yet another exemplary embodiment of the present disclosure provides an external combustion system including: a circulation line in which a fluid is stored; a boiler which heats the circulation line, and vaporizes the fluid stored in the circulation line; a power generator according to claim 4 into which the fluid vaporized by the boiler flows; a cooler which cools the circulation line in which the fluid discharged after passing through the power generator is stored; and an intake device according to any one of claims 1 to 3 which supplies the fluid in the circulation line cooled by the cooler to the boiler.

Still another exemplary embodiment of the present disclosure provides an internal combustion system including: a power generator according to claim 4; a fuel supply unit which supplies fuel to a fluid flow path of the power generator; an ignition unit which ignites a fluid which is mixed with the fuel supplied by the fuel supply unit and passes through the fluid flow path of the power generator; and a water supply unit which supplies water to the fluid flow path of the power generator, in which the water supply unit supplies water into the fluid flow path of the power generator when the interior of the fluid flow path of the power generator is heated, such that a power piston of the power generator is rotated by evaporated vapor.

Still yet another exemplary embodiment of the present disclosure provides an air hybrid power generation system including: an air tank in which compressed air is stored; an intake device according to any one of claims 1 to 3 which introduces outside air; a power generator according to claim 4 into which a fluid passing through the intake device flows; a fuel supply unit which supplies fuel to a fluid flow path of the power generator; an ignition unit which ignites a fluid which is mixed with the fuel supplied by the fuel supply unit and passes through the fluid flow path of the power generator; and a changeover valve which is installed between the air tank, the intake device, and the power generator, and changes an inflow and an outflow of the fluid to the air tank, the intake device, and the power generator.

In addition, the air hybrid power generation system may further include a control unit which controls the changeover valve, in which the control unit includes a first mode which controls the changeover valve so that the fluid discharged from the intake device is supplied to the air tank, a second mode which controls the changeover valve so that compressed air in the air tank is supplied to the power generator, and a third mode which controls the changeover valve so that the compressed air in the air tank and the fluid discharged from the intake device are supplied to the power generator.

In addition, the air hybrid power generation system may further include: a pressure detecting unit which detects internal pressure of the air tank, in which the control unit further includes a fourth mode which controls the changeover valve so that the compressed air in the air tank is supplied to the power generator, and combusts a fluid supplied to the power generator in accordance with information detected by the pressure detecting unit.

In addition, the air hybrid power generation system may further include: a rotating shaft which is connected with a piston of the intake device; and a clutch which is installed between one end portion of the rotating shaft and one end portion of the shaft which faces one end portion of the rotating shaft, and allows the rotating shaft and the shaft to be engaged with each other, in which the clutch is controlled by the control unit, and allows the rotating shaft and the shaft to be spaced apart from each other in the second mode and the fourth mode.

In addition, the air hybrid power generation system may further include: a water supply unit which supplies water to the fluid flow path of the power generator, in which the control unit alternately controls the water supply unit and the ignition unit to supply water into the fluid flow path of the power generator when the interior of the fluid flow path of the power generator is heated, such that a power piston of the power generator is rotated by using evaporated vapor.

Advantageous Effects

According to the exemplary embodiments of the present disclosure, the intake device or the power generator may introduce a fluid by using a simplified structure or may generate power by the introduced fluid, and the power system using the intake device and the power generator may produce and consume power with improved efficiency.

DESCRIPTION OF DRAWINGS

FIG. 1 is a perspective view illustrating an intake device according to a first exemplary embodiment of the present disclosure.

FIG. 2 is a cross-sectional view illustrating a cross section of FIG. 1.

FIGS. 3 and 4 are cross-sectional views illustrating an operation of an opening and closing unit in FIG. 1.

FIG. 5 is a cross-sectional view illustrating a power generator according to a second exemplary embodiment of the present disclosure.

FIGS. 6 and 7 are cross-sectional views illustrating an operation of a flow path opening and closing unit in FIG. 5.

FIG. 8 is a configuration diagram illustrating an external combustion system according to a third exemplary embodiment of the present disclosure.

FIG. 9 is a configuration diagram illustrating an internal combustion system according to a fourth exemplary embodiment of the present disclosure.

FIGS. 10, 12, and 13 are configuration diagrams illustrating an air hybrid power generation system according to a fifth exemplary embodiment of the present disclosure.

FIG. 11 is a control block diagram of the air hybrid power generation system according to the fifth exemplary embodiment of the present disclosure.

DESCRIPTION OF MAIN REFERENCE NUMERALS OF DRAWINGS

100: Intake device
110: Housing
111: Inlet part
112: Outlet part
115: Flow path
120: Piston
130: Opening and closing unit
133: Plurality of opening and closing members
135: Hinge shaft
139: Elastic member
150: Rotating shaft
200: Power generator
201: Hollow portion
210: Power generation housing
211: Fluid inlet part
212: Fluid outlet part
215: Fluid flow path
220: Power piston
230: Flow path opening and closing unit 233: Plurality of flow path opening and closing members
239: Elastic body
235: Catching projection
260: Ignition unit
270: Fuel supply unit
280: Water supply unit
301: Internal combustion system
401: External combustion system
410: Circulation line
420: Boiler
430: Cooler
500: Air hybrid power generation system
510: Air tank
520: Changeover valve
530: Pressure detecting unit
550: Control unit
551: First mode
552: Second mode
553: Third mode
554: Fourth mode
570: Clutch

[Best Mode]

Hereinafter, exemplary embodiments of the present disclosure will be described in detail with reference to the accompanying drawings so that those skilled in the technical field to which the present disclosure pertains may easily carry out the exemplary embodiments. The present disclosure may be implemented in various different ways, and is not limited to the exemplary embodiments described herein.

In several exemplary embodiments, constituent elements having the same configuration will be representatively described using the same reference numerals in a first exemplary embodiment, and other exemplary embodiments will be described with regard to only constituent elements that are different from the constituent elements described in the first exemplary embodiment.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. Further, the same reference numerals designate the same structures, elements or components illustrated in two or more drawings in order to exhibit similar characteristics.

Exemplary embodiments of the present disclosure illustrate ideal exemplary embodiments of the present disclosure in more detail. As a result, various modifications of the drawings are expected. Therefore, the exemplary embodiments are not limited to specific forms in regions illustrated in the drawings, and for example, include modifications of forms by the manufacture.

Hereinafter, an intake device 100, a power generator 200, an external combustion system 401 using the intake device 100 and the power generator 200, an internal combustion system 301 using the intake device 100 and the power generator 200, and an air hybrid power generation system 500 using the intake device 100 and the power generator 200 according to exemplary embodiments of the present disclosure will be described with reference to FIGS. 1 to 13.

An intake device 100 according to a first exemplary embodiment of the present disclosure will be described with reference to FIGS. 1 to 4.

As illustrated in FIGS. 1 and 2, the intake device 100 includes a circular housing 110, an annular flow path 115, an inlet part 111, a outlet part 112, a piston 120, and an opening and closing unit 130 which includes a plurality of opening and closing members 133 and elastic members 139.

Specifically, the housing 110 may be formed in an approximately cylinder shape having a circular cross section. In addition, a hollow portion 101 may be formed at a center of the housing 110.

The flow path 115 may be formed in an annular shape inside the housing 110. That is, the flow path 115 may be formed in a ring shape based on the center of the housing 110.

The inlet part 111 may be installed at one side of the housing 110. In addition, the inlet part 111 may guide a fluid to the flow path 115.

Specifically, the inlet part 111 may further include an inlet port formed in the housing 110, and an inlet tube connected with the inlet port. That is, the fluid flowing into the inlet tube may pass through the inlet port and flow into the flow path 115 of the housing 110.

The outlet part 112 may be installed at the other side of the housing 110. In addition, the outlet part 112 may guide a discharge of the fluid that has passed through the flow path 115.

Specifically, the outlet part 112 may be installed in the housing 110 so as to be spaced apart from the inlet part 111 installed in the housing 110. In addition, the outlet part 112 may further include a discharge port formed in the housing 110, and a discharge tube connected with the discharge port. That is, the fluid, which has passed through the flow path 115, may pass through the discharge port and may be discharged through the discharge tube.

The piston 120 is disposed in the flow path 115 and may move along the annular flow path 115. Specifically, a size and a shape of the piston 120 may be variably designed based on a size and a cross-sectional shape of the flow path 115.

Therefore, the piston 120 opens and closes the inlet part 111 and the outlet part 112 by moving in one direction along the flow path 115, thereby allowing the fluid to flow into the flow path 115 or allowing the fluid, which has passed through the flow path 115, to be discharged through the outlet part 112.

As illustrated in FIG. 3, the opening and closing unit 130 is installed between the inlet part 111 and the outlet part 112 and may open and close the flow path 115. In addition, the opening and closing unit 130 may be installed in the flow path 115 between the inlet part 111 and the outlet part 112.

Specifically, the opening and closing unit 130 may be installed in an opening and closing unit installation region 113 that protrudes toward both sides of the outside of the housing 110.

Therefore, the opening and closing unit 130 prevents the fluid flowing into the inlet part 111 from being discharged directly to the outlet part 112 without moving along the flow path 115. That is, the opening and closing unit 130 may selectively divide the flow path 115.

In addition, the opening and closing unit 130 may include the plurality of opening and closing members 133 and the elastic members 139.

The plurality of opening and closing members 133 may include a first opening and closing member 131 and a second opening and closing member 132. That is, the plurality of opening and closing members 133 may include a pair of opening and closing members.

The plurality of elastic members 139 may be formed to support the plurality of opening and closing members 133, respectively. Specifically, the plurality of elastic members 139 may include the first elastic member 137 and the second elastic member 138.

The first elastic member 137 is installed between an inner wall of the flow path 115 and the first opening and closing member 131, and may provide elastic force to the first opening and closing member 131.

In addition, the second elastic member 138 is installed between the second opening and closing member 132 and an inner wall of the flow path 115 which is opposite to the inner wall of the flow path 115 on which the first elastic member 137 is installed, and the second elastic member 138 may provide elastic force to the second opening and closing member 132.

The plurality of opening and closing members 133 opens the flow path 115 by moving away from each other by pressing force of the piston 120, and closes the flow path 115 by elastic force of the elastic member 139 and pressure of the fluid when the pressing force of the piston 120 is released.

In addition, when the pressing force of the piston 120 is released, the fluid between the installation region 113 and an outer circumferential surface of the first opening and closing member 131 and the fluid between the installation region 113 and an outer circumferential surface of the second opening and closing member 132 may provide pressing force to the outer circumferential surfaces of the first opening and closing member 131 and the second opening and closing member 312 in a direction in which the first opening and closing member 131 and the second opening and closing member 132 closes the flow path 115.

Therefore, when the pressing force caused by the piston 120 is released, the flow path 115 may be effectively closed not only by the force of the first elastic member 137 and the second elastic member 138, but also by the fluid between the installation region 113 and the outer circumferential surface of the first opening and closing member 131 and the fluid between the installation region 113 and the outer circumferential surface of the second opening and closing member 132.

Specifically, one end of the piston 120 protrudes in a rotation direction of the piston 120 so as to have an approximately V shape (wedge shape), and the other end of the first opening and closing member 131 and the other end of the second opening and closing member 132, which initially come into contact with one end of the piston 120 and are pressed by one end of the piston 120, have V-shaped grooves, respectively, which may be engaged with one end of the piston 120, such that the piston 120 and the first and second opening and closing members 131 and 132 are effectively engaged with each other, thereby opening the flow path 115.

In addition, with the protruding shape of one end of the piston 120 and the shapes of the first and second opening and closing members 131 and 132 which may be engaged with the protruding shape of one end of the piston 120, the piston 120 may open the flow path 115 by effectively rotating in one direction.

That is, when the piston 120 moves along the flow path 115 and presses the first opening and closing member 131 and the second opening and closing member 132 which are provided as a pair, the first opening and closing member 131 and the second opening and closing member 132 may press the first elastic member 137 and the second elastic member 138 by moving away from each other.

In this case, the piston 120 may move while pressing the plurality of opening and closing members 133 so as to open the flow path 115 closed by the plurality of opening and closing members 133.

In addition, when the piston 120 is detached from the plurality of opening and closing members 133 including the first opening and closing member 131 and the second opening and closing member 132 as the piston 120 moves, the first opening and closing member 131 and the second opening and closing member 132 may move to be close to each other by elastic force of the first elastic member 137 and the second elastic member 138, thereby closing the flow path 115.

In addition, the first opening and closing member 131 and the second opening and closing member 132 may effectively close the flow path 115 not only by the elastic force of the first elastic member 137 and the second elastic member 138, but also by the fluid between the outer circumferential surface of the first opening and closing member 131 and the installation region 113 and the fluid between the outer circumferential surface of the second opening and closing member 132 and the installation region 113.

Further, the opening and closing unit 130 may define one region between the opening and closing unit 130 and the piston 120 by dividing the flow path 115, and the piston 120 may compress the fluid in one region by moving along the flow path 115, thereby discharging the fluid through the outlet part 112.

In addition, the piston 120 of the intake device 100 according to the first exemplary embodiment of the present disclosure may include a first piston 125 and a second piston 127.

The first piston 125 precedes the second piston 127, and the first piston 125 and the second piston 127 may have a phase difference of 180°. In addition, the intake device 100 according to the first exemplary embodiment of the present disclosure may further include a discharge check valve 160.

The discharge check valve 160 may be installed in the outlet part 112 of the intake device 100. Specifically, the discharge check valve 160 may be installed in the discharge tube of the outlet part 112 in order to prevent the discharged fluid passing through the discharge tube from flowing back into the flow path 115.

In addition, the intake device 100 according to the first exemplary embodiment of the present disclosure may further include a rotating shaft 150, and a housing cover 140 formed with reinforcing ribs 141.

The housing cover 140 may be formed in a hollow cylinder shape. In addition, the housing cover 140 may be disposed in the hollow portion 101 formed in the circular housing 110.

That is, an outer circumferential surface of the housing cover 140 may be in contact with an inner circumferential surface of the hollow portion 101 formed in the circular housing 110, and may be rotatably coupled to the housing 110.

In addition, the housing cover 140 and the hollow portion 101 formed in the housing 110 may be coupled so that gastightness is maintained therebetween.

The outer circumferential surface of the housing cover 140 may be connected with the piston 120. That is, when the piston 120 moves along the flow path 115, the housing cover 140 may rotate.

The rotating shaft 150 may be disposed to penetrate the hollow portion 101 formed in the circular housing 110. Specifically, the rotating shaft 150 may be installed at a center of the housing cover 140.

In addition, the housing cover 140 and the rotating shaft 150 may be connected to each other by means of the reinforcing ribs 141. That is, the plurality of reinforcing ribs 141, which is radially formed from a center of the rotating shaft 150, may connect the inner circumferential surface of the housing cover 140 with the rotating shaft 150.

Therefore, the piston 120 may move along the annular flow path 115 by rotational force of the rotating shaft 150.

For example, when a rotating shaft of a power device such as a separate motor is coupled to the rotating shaft 150, the rotating shaft 150 is rotated to allow the piston 120 to move along the flow path 115.

Specifically, in a case in which the piston 120 includes the first piston 125 and the second piston 127, when the rotating shaft 150 makes one rotation (360 degrees), the plurality of opening and closing members 133 may open and close the flow path 115 two times by the first piston 125 and the second piston 127.

That is, the first piston 125 and the second piston 127 may be connected with the rotating shaft 150.

Alternatively, the rotating shaft of the power device and the piston 120 may be connected to the housing cover 140 and the reinforcing ribs 141 so as to allow the piston 120 to move along the flow path 115.

For example, the fluid flowing into the intake device 100 according to the first exemplary embodiment of the present disclosure may be gas.

In a case in which the fluid flowing into the intake device 100 is gas, the gas flowing into one region between the piston 120 and the flow path 115 closed by the opening and closing unit 130 may be compressed between the opening and closing unit 130 and the piston 120 by the movement of the piston 120 in a direction in which the piston 120 moves, and then may be discharged through the outlet part 112.

That is, in a case in which the fluid flowing into the intake device 100 is gas, the gas being discharged through the outlet part 112 of the intake device 100 may be gas compressed (pressed) by the piston 120.

In addition, as the piston 120 rotates along the annular flow path 115, the fluid may be effectively introduced through the inlet part 111 by negative pressure in the flow path 115.

In addition, the opening and closing unit 130 of the intake device 100 according to the first exemplary embodiment of the present disclosure may further include hinge shafts 135.

A plurality of hinge shafts 135 may be provided, and may support the plurality of opening and closing members 133 installed in the flow path 115 so that the plurality of opening and closing members 133 is rotatable. Specifically, the opening and closing unit 130 includes the plurality of hinge shafts 135, and the plurality of hinge shafts 135 may include a first hinge shaft 134 which supports the first opening and closing member 131, and a second hinge shaft 136 which supports the second opening and closing member 132.

That is, one end portion of the first opening and closing member 131 may be rotatably supported by the first hinge shaft 134, and the other end portion of the first opening and closing member 131 may be supported by the first elastic member 137.

In addition, like the first opening and closing member 131, the second opening and closing member 132 may also be supported by the second hinge shaft 136 and the second elastic member 138.

Specifically, the first hinge shaft 134 and the second hinge shaft 136 may be installed in the flow path 115 so as to be spaced apart from each other.

Therefore, when the piston 120 presses the first opening and closing member 131 and the second opening and closing member 132, the first opening and closing member 131 and the second opening and closing member 132 may move away from each other while rotating about the plurality of hinge shafts 135, respectively, thereby opening the flow path 115.

In addition, one end portion of each of the plurality of opening and closing members 133 may be spaced apart from each other and supported by each of the plurality of hinge shafts 135, and the other end portion of each of the plurality of opening and closing members 133 may be selectively spaced apart from each other by pressing force of the piston 120, thereby opening the flow path 115.

Therefore, the plurality of hinge shafts 135 may effectively support the rotations of the plurality of opening and closing members 133, and may guide the rotations of the plurality of opening and closing members 133 and the movements of the plurality of opening and closing members 133 in a direction in which the plurality of opening and closing members 133 move away from each other, thereby improving a lifespan of the plurality of opening and closing members 133.

In addition, the plurality of hinge shafts 135 may improve responsiveness of the plurality of opening and closing members 133 that may open and close the flow path 115.

A power generator 200 according to a second exemplary embodiment of the present disclosure will be described with reference to FIGS. 5 to 7.

The power generator 200 includes a circular power generation housing 210 which has a hollow portion 201 formed at a center thereof, a fluid flow path 215, a fluid inlet part 211, a fluid outlet part 212, a power piston 220, a shaft 250, and a flow path opening and closing unit 230.

The power generation housing 210 may be formed to have a circular cross section. In addition, the hollow portion 201 may be formed at the center of the power generation housing 210. For example, a central portion of the power generation housing 210 may be formed in a hollow cylinder shape.

The fluid flow path 215 may be formed in an annular shape inside the power generation housing 210.

The fluid inlet part 211 is installed at one side of the power generation housing 210, and may guide the inflow of the fluid into the fluid flow path 215. Specifically, the fluid inlet part 211 may further include a fluid inlet port formed in the power generation housing 210, and a fluid inlet tube connected with the fluid inlet port. That is, the fluid flowing into the fluid inlet tube may pass through the fluid inlet port and flow into the fluid flow path 215 of the power generation housing 210.

The fluid outlet part 212 is installed at the other side of the power generation housing 210, and may guide a discharge of the fluid which has been introduced from the fluid inlet part 211 and has passed through the fluid flow path 215.

Specifically, the fluid outlet part 212 may be installed in the power generation housing 210 so as to be spaced apart from the fluid inlet part 211 installed in the power generation housing 210. In addition, the fluid outlet part 212 may further include a fluid discharge port formed in the power generation housing 210, and a fluid discharge tube connected with the fluid discharge port.

That is, the fluid passing through the fluid flow path 215 may be discharged to the outside of the power generation housing 210 through the fluid outlet part 212.

The power piston 220 is disposed in the fluid flow path 215, and may be rotated in one direction along the fluid flow path 212 by the fluid introduced through the fluid inlet part 211.

Specifically, the power piston 220 may be moved by a flow or pressure of the fluid introduced through the fluid inlet part 211. In addition, the fluid introduced through the fluid inlet part 211 may rotate the power piston 220, and may be discharged through the fluid outlet part 212.

The shaft 250 is disposed to penetrate the hollow portion 201 formed in the housing 210 and connected with the power piston 220, such that the shaft 250 may be rotated when the power piston 220 moves along the fluid flow path 215.

Specifically, the power generation housing 210 may further include a housing cover 240 which is rotatably coupled to an inner circumferential surface of the hollow portion 201 of the power generation housing 210, and reinforcing ribs 241 which connect the shaft 250 and the housing cover 240.

The housing cover 240 is formed in a hollow cylinder shape, and may be formed such that the inner circumferential surface of the hollow portion 201 of the power generation housing 210 and an outer circumferential surface of the housing cover 240 are rotatably coupled. In addition, the housing cover 240 may be coupled such that the outer circumferential surface of the housing cover 240 and the inner circumferential surface of the hollow portion 201 of the power generation housing 210 are rotated while maintaining gastightness.

The shaft 250 is disposed at a center of the housing cover 240, and may be coupled to the housing cover 240 by means of the reinforcing ribs 241 radially disposed from a central axis of the shaft 250 between the inner circumferential surface of the housing cover 240 and an outer circumferential surface of the shaft 250.

Therefore, when the power piston 220 moves along the fluid flow path 215, the shaft 250 may also rotate.

When the power piston 220 makes one rotation along the annular fluid flow path 215, the shaft 250 may also make one rotation.

In addition, the power piston 220 of the power generator 200 according to the second exemplary embodiment of the present disclosure may include a first power piston 225 and a second power piston 227. The power generator 200 may be formed similar to that illustrated in the perspective view of the aforementioned intake device 100 illustrated in FIG. 1.

The flow path opening and closing unit 230 may be installed in the fluid flow path 215 between the fluid inlet part 211 and the fluid outlet part 212. In addition, the flow path opening and closing unit 230 may selectively divide the fluid flow path 215.

Specifically, the flow path opening and closing unit 230 may be installed in a flow path opening and closing unit installation region 213 that protrudes toward both sides of the outside of the power generation housing 210.

In addition, as illustrated in FIG. 6, the flow path opening and closing unit 230 may include a plurality of flow path opening and closing members 233, elastic bodies 239 which support the plurality of flow path opening and closing members 233, respectively, and a catching projection 235.

The plurality of flow path opening and closing members 233 may be formed as a pair of a first flow path opening and closing member 231 and a second flow path opening and closing member 232.

The elastic bodies 239 may include a first elastic body 237 which is installed between the first flow path opening and closing member 231 and the fluid flow path 215 and provides elastic force to the first flow path opening and closing member 231, and a second elastic body 238 which is installed between the second flow path opening and closing member 232 and the fluid flow path 215 and provides elastic force to the second flow path opening and closing member 232.

That is, the plurality of elastic bodies 239 is formed to provide elastic force to the plurality of flow path opening and closing members 233, and may support the plurality of flow path opening and closing members 233, respectively.

The catching projection 235 is installed in the fluid flow path 215, and may restrict a movement direction of the plurality of flow path opening and closing members 233. Specifically, the catching projection 235 is formed in the flow path opening and closing unit installation region 213 so as to protrude toward the fluid flow path 125 in a direction that intersects a sliding direction of the plurality of flow path opening and closing members 233, thereby restricting the sliding direction of the plurality of flow path opening and closing members 233.

In a case in which the power piston 220 includes the first power piston 225 and the second power piston 227 as illustrated in the aforementioned FIG. 5, when the shaft 250 makes one rotation (360 degrees), the plurality of flow path opening and closing members 233 may open and close the fluid flow path 215 two times by the first power piston 225 and the second power piston 227.

That is, the first power piston 225 and the second power piston 227 may be connected with the shaft 250.

As illustrated in FIG. 7, the plurality of flow path opening and closing members 233 may open the fluid flow path 215 by moving away from each other by pressing force of the power piston 220.

In addition, when the pressing force is released by the power piston 220, the plurality of flow path opening and closing members 233 is moved to be close to each other by elastic force of the elastic bodies 239, and pressure of the fluid presses the plurality of flow path opening and closing members 233, thereby closing the fluid flow path 215.

Specifically, when the first flow path opening and closing member 231 and the second flow path opening and closing member 232 are pressed by the power piston 220, the first flow path opening and closing member 231 and the second flow path opening and closing member 232 are moved away from each other, and press the first elastic body 237 and the second elastic body 238, respectively.

In this case, the power piston 220 moves along the fluid flow path 215 while pressing the first flow path opening and closing member 237 and the second flow path opening and closing member 238.

The plurality of flow path opening and closing members 233 slides in the movement direction of the power piston 220, and the plurality of flow path opening and closing members 233 may open the fluid flow path 215 by moving away from each other.

Specifically, the first flow path opening and closing member 231 and the second flow path opening and closing member 232 may open the fluid flow path 215 by moving away from each other by pressing force of the power piston 220 and simultaneously moving in the movement direction of the power piston 220.

In addition, the catching projection 235 is installed inside the fluid flow path 215 so as to be relatively closer to the fluid inlet part 211 than the fluid outlet part 212, and may inhibit the plurality of flow path opening and closing members 233 from sliding in the movement direction of the power piston 220.

In addition, when the pressing force, which presses the first flow path opening and closing member 231 and the second flow path opening and closing member 232 by the power piston 220, is released, the first flow path opening and closing member 231 and the second flow path opening and closing member 232 are moved to be close to each other by restoring force of the first elastic body 237 and the second elastic body 238, and close the fluid flow path 215 by pressing force of the fluid which presses surfaces of the plurality of flow path opening and closing members 233 that face the catching projection 235 in a direction in which the fluid flow path 215 is closed, thereby dividing the fluid flow path 215.

That is, the fluid between the catching projection 235 and the plurality of flow path opening and closing members 233 may be pressed in a direction in which the plurality of flow path opening and closing members 233 closes the fluid flow path 215. Therefore, the fluid flow path 215 may be effectively closed not only by elastic force of the elastic body 239, but also by the fluid between the catching projection 235 and the plurality of flow path opening and closing members 233.

Therefore, the flow path opening and closing unit 230 may define one region between the fluid inlet part 211 and the power piston 220 by dividing the fluid flow path 215, and as a result, the power piston 220 may discharge the fluid, which has been introduced through the fluid inlet part 211 and has rotated the power piston 220, through the fluid outlet part 212 by moving along the fluid flow path 215 by the flow and pressure of the fluid flowing into one region.

In addition, as illustrated in the aforementioned FIGS. 6 and 7, the power piston 220 rotates along the annular fluid flow path 215, and as a result, the fluid may effectively flow into the fluid flow path 215 through the fluid inlet part 211 by positive pressure of the fluid.

That is, the power piston 220, which moves along the annular fluid flow path 215, is moved by pressure of the introduced fluid, and rotates the shaft 250 connected with the power piston 220, thereby effectively transmitting rotational power.

An external combustion system 401 according to a third exemplary embodiment of the present disclosure will be described with reference to FIG. 8. In addition, descriptions of constituent elements identical to the constituent elements of the first exemplary embodiment and the second exemplary embodiment of the present disclosure will be omitted.

An external combustion system 401 according to the third exemplary embodiment of the present disclosure includes a circulation line 410, a boiler 420, the power generator 200, a cooler 430, and the intake device 100.

The fluid is stored in the circulation line 410. In addition, the circulation line 410 is formed in the form of a closed loop, and may circulate the fluid stored therein.

For example, the fluid stored in the circulation line 410 may be water that is vaporized by being heated.

The boiler 420 heats the circulation line 410 and vaporizes the fluid stored in the circulation line 410. Specifically, the boiler 420 may further include an air supply unit 421 which is formed to be opened at one side of a boiler housing having a combustion chamber therein, and an exhaust unit 422 which is formed at the other side of the boiler housing and discharges the air which has been introduced through the air supply unit 421 and has been combusted in the combustion chamber.

In addition, a non-illustrated fuel supply device may be installed in the combustion chamber of the boiler 420.

Therefore, a temperature of the fluid stored in the circulation line 410 passing through the combustion chamber is increased by heat generated in the combustion chamber of the boiler 420, and as a result, the fluid may be vaporized.

The vaporized fluid in the circulation line 410 may be supplied to the power generator 200. That is, the fluid vaporized by the boiler 420 may flow into the power generator 200.

Specifically, the power generator 200 may have the same configuration as the power generator 200 of the second exemplary embodiment.

Therefore, as illustrated in the aforementioned FIG. 5, the fluid, which is stored in the circulation line 410 and vaporized by the boiler 420, may be supplied through the fluid inlet part 211.

That is, the vaporized fluid may be supplied through the fluid inlet part 211 so as to move the power piston 220, and may be discharged through the fluid outlet part 212.

The fluid discharged through the fluid outlet part 212 of the power generator 200 may cool the fluid vaporized by the cooler 430 and change a phase of the fluid.

For example, in a case in which the fluid stored in the circulation line 410 is water, the fluid (steam) vaporized by the boiler 420 may become water again by being cooled by the cooler 430.

That is, the cooler 430 may cool the fluid stored in the circulation line 410.

For example, the circulation line 410 may be cooled in an air-cooled manner.

In addition, the circulation line 410 is installed between the cooler 430 and the boiler 420, and may circulate the fluid stored therein.

The intake device 100 may allow the fluid in the circulation line 410 to be supplied to the boiler 420 so that the fluid cooled by the cooler 430 is heated by the boiler 420. In addition, the intake device 100 may be installed between the cooler 430 and the boiler 420.

The intake device 100 may include the same configuration as the intake device 100 of the first exemplary embodiment of the present disclosure. For example, the intake device 100 according to the third exemplary embodiment of the present disclosure may be a pump.

Therefore, as illustrated in the aforementioned FIG. 2, the fluid cooled by the cooler 430 may be supplied to the intake device 100 through the inlet part 111.

The piston 120 of the intake device 100 is connected with the shaft 250 of the power generator 200, such that the piston 120 may be rotated together with the shaft 250 when the shaft 250 rotates. Therefore, the fluid flowing into the intake device 100 through the inlet part 111 may be discharged through the outlet part 112 by the rotation of the piston 120, and may be supplied to the circulation line 410.

In addition, a part of the circulation line 410 connects the outlet part 112 of the intake device 100 and the fluid inlet part 211 of the power generator 200, and the fluid stored in the circulation line 410 is heated by the boiler 420.

Further, the remaining part of the circulation line 410 connects the fluid outlet part 212 of the power generator 200 and the inlet part 111 of the intake device 100, and the vaporized fluid in the circulation line 410 may be cooled by the cooler 130.

Specifically, in a case in which the intake device 100 includes the rotating shaft 150, the rotating shaft 150 and the shaft 250 of the power generator 200 may be connected to each other and rotated together.

In addition, the piston 120 of the intake device 100 may be directly connected to the shaft 250 of the power generator 200.

Therefore, one side of the shaft 250 of the power generator 200 may transmit power to a non-illustrated device, and the other side of the shaft 250 of the power generator 200 may rotate the piston 120 of the intake device 100.

With the aforementioned configuration, the external combustion system 401 according to the third exemplary embodiment of the present disclosure may transmit power by the rotation of the shaft 250 of the power generator 200 and effectively rotate the piston 120 of the intake device 100.

Therefore, the shaft 250 of the power generator 200 may effectively rotate the piston 120 of the intake device 100 without using a separate power source for allowing the fluid stored in the circulation line 410 to flow.

An internal combustion system 301 according to a fourth exemplary embodiment of the present disclosure will be described with reference to FIG. 9. In addition, descriptions of constituent elements identical to the constituent elements of the first exemplary embodiment and the second exemplary embodiment of the present disclosure will be omitted.

An internal combustion system 301 according to a fourth exemplary embodiment of the present disclosure includes the intake device 100, the power generator 200, a fuel supply unit 270, an ignition unit 260, and a water supply unit 280.

The intake device 100 may include the same configuration as the intake device 100 of the first exemplary embodiment of the present disclosure.

The power generator 200 may include the same configuration as the power generator 200 of the second exemplary embodiment of the present disclosure.

The fuel supply unit 270 may supply fuel into the fluid flow path 215 of the power generator 200. Specifically, the fuel supply unit 270 is installed at one side of the power generation housing 210 of the power generator 200, and may supply fuel into the fluid flow path 215.

That is, the pressed gas discharged through the outlet part 112 of the intake device 100 flows into the fluid flow path 215 through the fluid inlet part 211 of the power generator 200. In this case, when the fuel is supplied into the fluid flow path 215 by the fuel supply unit 270, the gas and the fuel may be mixed in the fluid flow path 215.

The ignition unit 260 may ignite the gas mixed with the fuel in the fluid flow path 215. Specifically, the ignition unit 260 may be installed in the power generation housing 210 of the power generator 200 so as to be adjacent to the fuel supply unit 270.

In addition, the ignition unit 260 ignites the gaseous mixture formed by mixing the gas and the fuel in the fluid flow path 215 such that the gaseous mixture explodes in the fluid flow path 215.

Therefore, when the explosion occurs in the fluid flow path 215, the power piston 220 moves along the fluid flow path 215 by explosive power, and the shaft 250 connected with the power piston 220 rotates, thereby transmitting power. That is, the shaft 250 connected to the power piston 220, which moves along the fluid flow path 215, may generate rotational power by rotating.

The water supply unit 280 may supply water into the fluid flow path 215. Specifically, the water supply unit 280 may be installed in the power generation housing 210 of the power generator 200. The water supply unit 280 may supply water into the fluid flow path 215 after the power piston 220 rotates along the fluid flow path 215 to make one rotation by explosive power generated as a mixed fluid, which is made by mixing the fuel supplied by the fuel supply unit 270 and the fluid in the fluid flow path 215, is ignited by the ignition unit 260 and combusted.

The water supply unit 280 may supply water into the fluid flow path 215. Specifically, the water supply unit 280 may be installed in the power generation housing 210 of the power generator 200. The water supply unit 280 may supply water into the fluid flow path 215 after the power piston 220 rotates along the fluid flow path 215 to make one rotation by explosive power generated as a mixed fluid, which is made by mixing the fuel supplied by the fuel supply unit 270 and the fluid in the fluid flow path 215, is ignited by the ignition unit 260 and combusted.

That is, the water supply unit 280 supplies water into the fluid flow path 215 after the interior of the fluid flow path 215 is heated by the combustion in the interior of the fluid flow path 215, such that the water and the compressed gas introduced through the fluid inlet part 215 may be mixed and the water may be vaporized by the heated fluid flow path 215. Therefore, pressure of the water vaporized in the fluid flow path 215 is increased, and may rotate the power piston 220. That is, the power piston 220 may rotate along the fluid flow path 215 to make one rotation by the vaporization of water supplied from the water supply unit 280.

Specifically, when the water is supplied into the fluid flow path 215 by the water supply unit 280, the operations of the fuel supply unit 270 and the ignition unit 260 are stopped.

That is, the fuel supply unit 270 and the ignition unit 260 may operate alternately with the water supply unit 280 by a non-illustrated control unit.

In addition, the water supply unit 280 may cool the interior of the fluid flow path 215 which has been heated by the combustion.

The rotational power of the shaft 250 is connected with the piston 120 inside the intake device 100, such that the fluid may smoothly flow into the intake device 100.

The shaft 250 and the piston 120 inside the intake device 100 may be connected in the same manner as that in the aforementioned third exemplary embodiment.

Alternatively, in a case in which the intake device 100 of the first exemplary embodiment of the present disclosure includes the first piston 125 and the second piston 127 and the power generator 200 of the second exemplary embodiment includes the first power piston 225 and the second power piston 227, the water supply unit 280 may supply water into the fluid flow path 215 after the first power piston 225 or the second power piston 227 of the power piston 220 rotates along the fluid flow path 215 by explosive power generated as a mixed fluid, which is made by mixing the fuel supplied by the fuel supply unit 270 and the fluid in the fluid flow path 215, is ignited by the ignition unit 260 and combusted.

That is, the water supply unit 280 supplies water into the fluid flow path 215 after the interior of the fluid flow path 215 is heated by the combustion in the interior of the fluid flow path 215, such that the water and the compressed gas introduced through the fluid inlet part 215 may be mixed and the water may be vaporized by the heated fluid flow path 215. Therefore, pressure of the water vaporized in the fluid flow path 215 is increased, and may rotate the power piston 220.

Specifically, the first power piston 225 or the second power piston 227 of the power piston 220 may rotate along the fluid flow path 215 by the vaporization of the water supplied from the water supply unit 280.

Therefore, the first power piston 225 and the second power piston 227 rotate along the fluid flow path 215 to make one rotation while the shaft 250 rotates to make one rotation, thereby effectively generating power. That is, the first power piston 225 or the second power piston 227 opens and closes the plurality of flow path opening and closing members 233, and opens and closes the plurality of flow path opening and closing members 233 two times while the shaft 250 rotates to make one rotation.

In addition, the power generator 200 of the internal combustion system 301 according to the fourth exemplary embodiment of the present disclosure may further include an inlet check valve 290.

The inlet check valve 290 may be installed in the fluid inlet part 211 of the power generator 200. Specifically, the inlet check valve 290 is installed in the fluid inlet tube of the fluid inlet part 211 in order to prevent the fluid passing through the fluid inlet tube from being discharged through the fluid inlet part 211.

That is, the inlet check valve 290 may be opened when the fluid flows into the fluid flow path 215 of the power generator 200 through the fluid inlet part 211, and the inlet check valve 290 may be closed when there is no fluid to be introduced through the fluid inlet part 211.

Therefore, the internal combustion system 301 according to the present disclosure not only generates power by combusting fuel like a typical internal combustion engine, but also generates power by rotating the power piston 220 by the vaporization of the water supplied from the water supply unit 280.

That is, the internal combustion system 301 according to the present disclosure may reduce fuel consumption in comparison with an internal combustion engine in the related art, and effectively reduce nitrogen oxide included in exhaust gas generated by the combustion of fuel.

An air hybrid power generation system 500 according to a fifth exemplary embodiment of the present disclosure will be described with reference to FIGS. 10 to 13. In addition, descriptions of constituent elements identical to the constituent elements of the first exemplary embodiment and the second exemplary embodiment of the present disclosure will be omitted.

An air hybrid power generation system 500 according to a fifth exemplary embodiment of the present disclosure includes an air tank 510, the intake device 100, the power generator 200, the fuel supply unit 270, the ignition unit 260, and a changeover valve 520.

The air tank 510 stores compressed air therein. Specifically, the interior of the air tank 510 may be filled with compressed air.

The intake device 100 may include the same configuration as the intake device 100 of the first exemplary embodiment of the present disclosure. Therefore, the intake device 100 may introduce outside air through the inlet part 111.

The power generator 200 may include the same configuration as the power generator 200 of the second exemplary embodiment of the present disclosure. Specifically, the air supplied to the power generator 200 may be supplied from the air tank 510, or may be supplied through the outlet part 112 of the intake device 100.

The fuel supply unit 270 and the ignition unit 260 may be formed to have the same configurations as the fuel supply unit 270 and the ignition unit 260 included in the internal combustion system 301 of the aforementioned fourth exemplary embodiment of the present disclosure.

Therefore, the fluid is supplied into the fluid flow path 215 through the fluid inlet part 211 of the power generator 200, and the power piston 220 is rotated by explosive pressure generated as a mixed fluid, which is made by mixing the fluid and the fuel supplied by the fuel supply unit 270, is ignited by the ignition unit 260 and combusted, thereby generating rotational power of the shaft 250.

The changeover valve 520 may allow the compressed air stored in the air tank 510 or the outside air discharged through the outlet part 112 of the intake device 100 to be selectively supplied to the power generator 200.

That is, as the changeover valve 520 operates, the compressed air stored in the air tank 510 may be supplied to the power generator 200 or the outside air discharged through the outlet part 112 of the intake device 100 may be supplied to the power generator 200.

Therefore, a drive apparatus having the hybrid power generation system 500 such as an automobile may supply air to the power generator 200 selectively by the air tank 510 or the intake device 100.

In addition, as illustrated in FIG. 11, the air hybrid power generation system 500 of the fifth exemplary embodiment of the present disclosure may further include a control unit 550.

The control unit 550 may control the operation of the changeover valve 520. That is, the control unit 550 operates the changeover valve 520 so as to allow the compressed air stored in the air tank 510 to be supplied to the power generator 200 or allow the outside air discharged through the outlet part 112 of the intake device 100 to be supplied to the power generator 200.

Specifically, the air hybrid power generation system 500 may further include a speed detecting unit 540. Therefore, the control unit 550 detects a speed of the drive apparatus having the air hybrid power generation system 500, and may control the operation of the changeover valve 520 by determining and comparing information of the speed detected by the speed detecting unit 540 and a predetermined speed preset to the control unit 550.

For example, the speed detecting unit 540 may determine whether the automobile accelerates or decelerates by detecting a separate speed detecting sensor or a rotation angle of an accelerator of the automobile.

In addition, the intake device 100 of the air hybrid power generation system 500 according to the fifth exemplary embodiment of the present disclosure may further include the discharge check valve 160.

The discharge check valve 160 may be installed in the outlet part 112 of the intake device 100. Specifically, the discharge check valve 160 may be installed in the discharge tube of the outlet part 112 in order to prevent the discharged fluid passing through the discharge tube from flowing back into the flow path 115.

That is, the discharge check valve 160 may be opened when the fluid is discharged to the outside of the flow path 115 of the intake device 100 through the outlet part 112, and the discharge check valve 160 may be closed when there is no fluid to be discharged through the outlet part 112.

In addition, the control unit 550 may include a first mode 551, a second mode 552, and a third mode 553.

As illustrated in FIG. 10, in the first mode 551, the control unit 550 may control the changeover valve 520 to allow the fluid discharged from the intake device 100 to be supplied to the air tank 510. That is, in the first mode 551, the outlet part 112 of the intake device 100 and an entrance portion 511 of the air tank 510 may communicate with each other. In this case, no air is supplied to the power generator 200.

Specifically, in a case in which the drive apparatus having the air hybrid power generation system 500 decelerates in the first mode 551, the outside air introduced through the inlet part 111 of the intake device 100 may flow into the entrance portion 511 of the air tank 510 through the outlet part 112 of the intake device 100 by using rotational force of the rotating shaft 150 of the intake device 100, thereby filling the air tank 510 with air.

That is, the outside air introduced through the inlet part 111 of the intake device 100 may be supplied to the air tank 510 through the outlet part 112 of the intake device 100, and the outside air supplied to the air tank 510 by the rotation of the piston 120 of the intake device 100 may be compressed, and thus the air tank 510 is filled with the air.

Specifically, the air hybrid power generation system 500 may include a valve 295. The valve 295 may be installed at one side of the fluid inlet part 211 of the power generator 200.

In the first mode 551, the valve 295 is opened, such that the outside air may be supplied into the fluid flow path 215, moved along the fluid flow path 215 by the power piston 220, and then discharged through the fluid outlet part 212.

As illustrated in FIG. 12, in the second mode 552, the control unit 550 may control the changeover valve 520 to supply the compressed air stored in the air tank 510 to the power generator 200. In this case, the changeover valve 520 may allow the power generator 200 and the air tank 510 to communicate with each other, and may close the outlet part 112 of the intake device 100.

That is, in the second mode 552, the changeover valve 520 allows only the compressed air stored in the air tank 510 to be supplied to the power generator 200.

Therefore, in the second mode 552, in a case in which the drive apparatus having the air hybrid power generation system 500 operates at a low speed preset to the control unit 550, power may be produced by rotational force of the shaft 250 of the power generator 200 which is rotated only by the compressed air of the air tank 510.

In addition, in the second mode 552, the control unit 550 may stop the operations of the fuel supply unit 270 and the ignition unit 260 which supply fuel to the power generator 200, such that the combustion is not performed by the compressed air in the power generator 200.

That is, in the second mode 552, the drive apparatus having the air hybrid power generation system 500 may be operated only by the compressed air stored in the air tank 310.

Therefore, the drive apparatus may effectively reduce nitrogen oxide and the like included in exhaust gas generated when the air and the fuel are combusted, and may effectively reduce fuel consumption.

The hybrid power generation system 500 according to the fifth exemplary embodiment of the present disclosure may further include the rotating shaft 150 and a clutch 570.

The rotating shaft 150 may be formed in the same shape as the intake device 100 of the first exemplary embodiment of the present disclosure.

The clutch 570 may include a first clutch portion 571 which is installed at one end portion of the rotating shaft 150 of the intake device 100, and a second clutch portion 572 which is engaged with the first clutch portion 571 and may rotate together with the rotating shaft 150. That is, the clutch 570 may be installed between one end portion of the rotating shaft 150 of the intake device 100 and the shaft 250 of the power generator 200 which faces one end portion of the rotating shaft 150 of the intake device 100.

Specifically, the second clutch portion 572 is installed at one end portion of the shaft 250 of the power generator 200 which faces one end portion of the rotating shaft 150, and may be selectively engaged with the first clutch portion 571.

In addition, the clutch 570 may be controlled by the control unit 550.

Specifically, in the second mode 552, the first clutch portion 571 and the second clutch portion 572 are spaced apart from each other, such that power may be generated only by the rotation of the shaft 250 of the power generator 200.

Therefore, in this case, power required to operate the intake device 100 may be reduced and the drive apparatus may be operated only by the compressed air, and as a result, it is possible to reduce energy consumption in comparison with a case in which the rotating shaft 150 is rotated to operate the intake device 100.

As illustrated in FIG. 13, in the third mode 552, the control unit 550 controls the changeover valve 520, such that the compressed air stored in the air tank 510 and the outside air passing through the outlet part 112 of the intake device 100 may be supplied to the power generator 200.

In this case, the changeover valve 520 allows the compressed air passing through the entrance portion 511 of the air tank 510 and the outside air passing through the outlet part 112 of the intake device 100 to communicate with the power generator 200.

In addition, in the third mode 553, the control unit 550 may operate the fuel supply unit 270 and the ignition unit 260 to inject the fuel into the fluid flow path 215 of the power generator 200, and may allow a mixed fluid, which is made by mixing the fuel and the fluid in the fluid flow path 215, to be ignited and combusted.

Specifically, in a case in which the drive apparatus having the air hybrid power generation system 500 is operated at a high speed preset to the control unit 550, the control unit 550 may control the changeover valve 520, the fuel supply unit 270, and the ignition unit 260 in the third mode 553, thereby improving the rotation of the shaft 250 of the power generator 200.

That is, in a case in which the drive apparatus operates at a high speed, the fluid flowing into the fluid inlet part 211 of the power generator 200, the outside air passing through the outlet part 111 of the intake device 100, and the compressed air stored in the air tank 510 may flow into the power generator 200 and combusted.

In addition, the air hybrid power generation system 500 according to the fifth exemplary embodiment of the present disclosure may further include a pressure detecting unit 530.

The pressure detecting unit 530 may detect pressure in the air tank 510. That is, the pressure detecting unit 530 may detect the amount of compressed air stored in the air tank 510.

In addition, the control unit 550 may further include a fourth mode 554.

When the control unit 550 controls the changeover valve 520 so that the compressed air stored in the air tank 510 is supplied to the power generator 200 and the outlet part 111 of the intake device 100 is closed, the control unit 550 may combust the compressed air supplied to the power generator 200 by comparing information detected by the pressure detecting sensor 530 and a present pressure value.

Specifically, in a case in which the information detected by the pressure detecting unit 530 is equal to or greater than a preset pressure value and a high-speed operation is required, the control unit 550 may determine that the shaft 250 of the power generator 200 cannot be effectively rotated by the compressed air stored in the air tank 510, and may operate the fuel supply unit 270 and the ignition unit 260 such that the combustion is performed in the fluid flow path 215 of the power generator 200.

In addition, in the fourth mode 554, the first clutch portion 571 and the second clutch portion 572 are spaced apart from each other, and as a result, power may be generated only by the rotation of the shaft 250. That is, in the second mode 552 and the fourth mode 554, the control unit 550 may allow the rotating shaft 150 of the intake device 100 and the shaft 250 of the power generator 200 to be spaced apart from each other.

Therefore, in this case, power required to operate the intake device 100 may be reduced and the drive apparatus may operate at a high speed with a small amount of fuel, and as a result, it is possible to reduce energy consumption in comparison with a case in which the rotating shaft 150 is rotated to operate the intake device 100.

In addition, in the first mode 551 and the third mode 553, the control unit 550 may control the clutch 570 so that the rotating shaft 150 of the intake device 100 and the shaft 250 of the power generator 200 are engaged with each other.

In a case in which the information detected by the pressure detecting sensor 530 is equal to or greater than a preset pressure value, the control unit 550 controls the changeover valve 520 so that the compressed air stored in the air tank 510 is supplied to the power generator 200 and the outlet part 111 of the intake device 100 is closed, and in a case in which the information detected by the pressure detecting sensor 530 is below the preset pressure value, the control unit 550 controls the clutch 570 and the changeover valve 520 so as to allow air to be supplied to the power generator 200 through the intake device 100.

Specifically, the control unit 550 may control the clutch 570 so that the rotating shaft 150 and the shaft 250 are engaged with each other, and may control the changeover valve 520 so that air is supplied to the power generator 200 through the intake device 100.

Therefore, the control unit 550 of the air hybrid power generation system 500 may operate in various modes based on a preset value according to a speed or based on pressure of the compressed air stored in the air tank 510.

That is, unlike a case in which the combustion is always performed when the automobile in the related art travels, the combustion is selectively performed in the power generator 200 in accordance with a state of the drive apparatus having the air hybrid power generation system 500, and as a result, it is possible to fill the air tank 510 with air when the drive apparatus decelerates, and generate power only by the compressed air in the air tank 510 when the drive apparatus travels at a low speed, thereby preventing exhaust gas including nitrogen oxide from being discharged.

In addition, the air hybrid power generation system 500 according to the fifth exemplary embodiment of the present disclosure may further include the water supply unit 280.

The water supply unit 280 may be formed to have the same configuration as the water supply unit 280 of the aforementioned fourth exemplary embodiment of the present disclosure.

The water supply unit 280 may be controlled by the control unit 550. Specifically, the water supply unit 280 injects water into the fluid flow path 215 heated after the fuel supply unit 270 and the ignition unit 260 are operated by the control unit 550 and the combustion is performed in the power generator 200, and the power piston 220 may be rotated by pressure of the vaporized fluid.

In addition, the water supply unit 280 may be controlled by the control unit 550 alternately with the fuel supply unit 270 and the ignition unit 260. Specifically, while the power piston 220 rotates along the fluid flow path 215 to make one rotation, the fuel supply unit 270 and the ignition unit 260 may be operated and the water supply unit 280 may be stopped, and thereafter, while the power piston 220 rotates along the fluid flow path 215 to make one rotation, the fuel supply unit 270 and the ignition unit 260 may be stopped and the water supply unit 280 may be operated.

For example, in the third mode 553 and the fourth mode 554, the control unit 550 may operate the water supply unit 280.

Therefore, the air hybrid power generation system 500 according to the fifth exemplary embodiment of the present disclosure may rotate the power piston 220 by vapor evaporated not only by the combustion of fuel but also by using the water supply unit 280, and as a result, it is possible to reduce fuel consumption and reduce the amount of nitrogen oxide included in exhaust gas.

The exemplary embodiment of the present disclosure has been described with reference to the accompanying drawings, but those skilled in the art will understand that the present disclosure may be carried out in any other specific form without changing the technical spirit or an essential feature thereof.

Accordingly, it should be understood that the aforementioned exemplary embodiment is described for illustration in all aspects and is not limited, and the scope of the present disclosure shall be represented by the detailed description and the claims to be described below, and it should be construed that all of the changes or modified forms induced from the meaning and the scope of the claims, and an equivalent concept thereto are included in the scope of the present disclosure.

The invention claimed is:

1. An intake device comprising:
    an annular flow path which is formed in a circular housing;
    an inlet part which is installed at one side of the housing and guides an inflow of a fluid into the flow path;
    an outlet part which is installed at the other side of the housing and guides a discharge of the fluid which flows into the inlet part and passes through the flow path;
    a piston which is disposed in the flow path, and rotates along the flow path so as to compress the fluid introduced through the inlet part; and
    an opening and closing unit which is installed in the flow path between the inlet part and the outlet part, includes a plurality of opening and closing members, and elastic members which are installed between the plurality of opening and closing members and the flow path so as to support the plurality of opening and closing members, respectively, and opens and closes the flow path by pressing of the piston,
    wherein when the pressing of the piston is released, the plurality of opening and closing members closes the flow path by pressing force of the fluid which presses outer circumferential surfaces of the plurality of opening and closing members in a direction in which the flow path is closed, and by elastic force of the elastic members.

2. The intake device of claim 1, wherein the opening and closing unit further includes hinge shafts that allow the plurality of opening and closing members to be rotated based on one side thereof so as to be away from each other when the plurality of opening and closing members opens the flow path.

3. The intake device of claim 2, wherein the piston includes:
    a first piston which moves along the flow path; and
    a second piston which moves along the flow path while having a phase difference of 180 degrees with the first piston.

4. An external combustion system comprising:
the intake device according to claim 1;
a circulation line in which the fluid is stored;
a boiler which heats the circulation line, and vaporizes the fluid stored in the circulation line;
a power generator into which the fluid vaporized by the boiler flows; and
a cooler which cools the circulation line in which the fluid discharged after passing through the power generator is stored,
wherein the intake device supplies the fluid in the circulation line cooled by the cooler to the boiler.

5. The external combustion system according to claim 4, wherein said power generator comprises a circular power generation housing which has a hollow portion formed at a center thereof;
an annular fluid flow path which is formed in the power generation housing;
a fluid inlet part which is installed at one side of the power generation housing and guides an inflow of the fluid into the fluid flow path;
a fluid outlet part which is installed at the other side of the power generation housing and guides a discharge of the fluid which flows into the fluid inlet part and passes through the fluid flow path;
a power piston which is disposed in the fluid flow path, and rotates along the fluid flow path by the fluid introduced through the fluid inlet part;
a shaft which penetrates the hollow portion of the power generation housing, and is connected with the power piston so as to rotate together with the power piston when the power piston rotates; and
a flow path opening and closing unit which is installed in the fluid flow path between the fluid inlet part and the fluid outlet part, and includes a plurality of flow path opening and closing members, elastic bodies that are installed between the plurality of flow path opening and closing members and the fluid flow path and support the plurality of flow path opening and closing members, respectively, and a catching projection that inhibits the plurality of flow path opening and closing members from sliding in the movement direction of the power piston,
wherein the plurality of flow path opening and closing members opens the fluid flow path by moving away from each other while sliding in the movement direction of the power piston by pressing force of the power piston, and when pressing force of the power piston is released, the plurality of flow path opening and closing members closes the fluid flow path by pressing force of the fluid between the plurality of flow path opening and closing members and the catching projection in a direction in which the fluid flow path is closed, and by elastic force of the elastic bodies.

6. An internal combustion system comprising:
a power generator;
a fuel supply unit which supplies fuel to a fluid flow path of the power generator;
the intake device according to claim 1 which supplies the fluid to the fluid flow path of the power generator;
an ignition unit which ignites the fluid which is mixed with the fuel supplied by the fuel supply unit and passes through the fluid flow path of the power generator; and
a water supply unit which supplies water to the fluid flow path of the power generator,
wherein the water supply unit supplies water into the fluid flow path of the power generator when the interior of the fluid flow path of the power generator is heated, and a power piston of the power generator is rotated by evaporated vapor.

7. The internal combustion system according to claim 6, wherein said power generator comprises a circular power generation housing which has a hollow portion formed at a center thereof;
an annular fluid flow path which is formed in the power generation housing;
a fluid inlet part which is installed at one side of the power generation housing and guides an inflow of the fluid into the fluid flow path;
a fluid outlet part which is installed at the other side of the power generation housing and guides a discharge of the fluid which flows into the fluid inlet part and passes through the fluid flow path;
a power piston which is disposed in the fluid flow path, and rotates along the fluid flow path by the fluid introduced through the fluid inlet part;
a shaft which penetrates the hollow portion of the power generation housing, and is connected with the power piston so as to rotate together with the power piston when the power piston rotates; and
a flow path opening and closing unit which is installed in the fluid flow path between the fluid inlet part and the fluid outlet part, and includes a plurality of flow path opening and closing members, elastic bodies that are installed between the plurality of flow path opening and closing members and the fluid flow path and support the plurality of flow path opening and closing members, respectively, and a catching projection that inhibits the plurality of flow path opening and closing members from sliding in the movement direction of the power piston,
wherein the plurality of flow path opening and closing members opens the fluid flow path by moving away from each other while sliding in the movement direction of the power piston by pressing force of the power piston, and when pressing force of the power piston is released, the plurality of flow path opening and closing members closes the fluid flow path by pressing force of the fluid between the plurality of flow path opening and closing members and the catching projection in a direction in which the fluid flow path is closed, and by elastic force of the elastic bodies.

8. An air hybrid power generation system comprising:
an air tank in which compressed air is stored;
the intake device according to claim 1 which introduces outside air;
a power generator into which the air passing through the intake device flows;
a fuel supply unit which supplies fuel to a fluid flow path of the power generator;
an ignition unit which ignites the air which is mixed with the fuel supplied by the fuel supply unit and passes through the fluid flow path of the power generator; and
a changeover valve which is installed between the air tank, the intake device, and the power generator, and changes an inflow and an outflow of the air to the air tank, the intake device, and the power generator.

9. The air hybrid power generation system of claim 8, further comprising:
a control unit which controls the changeover valve,
wherein the control unit is configured to include a first mode which controls the changeover valve so that the air discharged from the intake device is supplied to the air tank, a second mode which controls the changeover valve so that compressed air in the air tank is supplied to the power generator, and a third mode which controls the changeover valve so that the compressed air in the air tank and the air discharged from the intake device are supplied to the power generator.

10. The air hybrid power generation system of claim 9, further comprising:
a pressure detecting unit which detects internal pressure of the air tank,
wherein the control unit is configured to further include a fourth mode which controls the changeover valve so that the compressed air in the air tank is supplied to the power generator, and combusts the air supplied to the power generator in accordance with the pressure detected by the pressure detecting unit.

11. The air hybrid power generation system of claim 10, further comprising:
a rotating shaft which is connected with a piston of the intake device; and
a clutch which is installed between one end portion of the rotating shaft and one end portion of a shaft of the power generator which faces the one end portion of the rotating shaft, and allows the rotating shaft and the shaft to be engaged with each other,
wherein the control unit is configured to control the clutch such that the rotating shaft and the shaft are spaced apart from each other in the second mode and the fourth mode.

12. The air hybrid power generation system of claim 11, further comprising:
a water supply unit which supplies water to the fluid flow path of the power generator,
wherein the control unit is configured to alternately control the water supply unit and the ignition unit to supply water into the fluid flow path of the power generator when the interior of the fluid flow path of the power generator is heated, such that a power piston of the power generator is rotated by using evaporated vapor.

13. The air hybrid power generation system according to claim 8, wherein said power generator comprises a circular power generation housing which has a hollow portion formed at a center thereof;
an annular fluid flow path which is formed in the power generation housing;
a fluid inlet part which is installed at one side of the power generation housing and guides an inflow of the air into the fluid flow path;
a fluid outlet part which is installed at the other side of the power generation housing and guides a discharge of the air which flows into the fluid inlet part and passes through the fluid flow path;
a power piston which is disposed in the fluid flow path, and rotates along the fluid flow path by the air introduced through the fluid inlet part;
a shaft which penetrates the hollow portion of the power generation housing, and is connected with the power piston so as to rotate together with the power piston when the power piston rotates; and
a flow path opening and closing unit which is installed in the fluid flow path between the fluid inlet part and the fluid outlet part, and includes a plurality of flow path opening and closing members, elastic bodies that are installed between the plurality of flow path opening and closing members and the fluid flow path and support the plurality of flow path opening and closing members, respectively, and a catching projection that inhibits the plurality of flow path opening and closing members from sliding in the movement direction of the power piston,
wherein the plurality of flow path opening and closing members opens the fluid flow path by moving away from each other while sliding in the movement direction of the power piston by pressing force of the power piston, and when pressing force of the power piston is released, the plurality of flow path opening and closing members closes the fluid flow path by pressing force of the air between the plurality of flow path opening and closing members and the catching projection in a direction in which the fluid flow path is closed, and by elastic force of the elastic bodies.

14. A power generator comprising:
a circular power generation housing which has a hollow portion formed at a center thereof;
an annular fluid flow path which is formed in the power generation housing;
a fluid inlet part which is installed at one side of the power generation housing and guides an inflow of a fluid into the fluid flow path;
a fluid outlet part which is installed at the other side of the power generation housing and guides a discharge of the fluid which flows into the fluid inlet part and passes through the fluid flow path;
a power piston which is disposed in the fluid flow path, and rotates along the fluid flow path by the fluid introduced through the fluid inlet part;
a shaft which penetrates the hollow portion of the power generation housing, and is connected with the power piston so as to rotate together with the power piston when the power piston rotates; and
a flow path opening and closing unit which is installed in the fluid flow path between the fluid inlet part and the fluid outlet part, and includes a plurality of flow path opening and closing members, elastic bodies that are installed between the plurality of flow path opening and closing members and the fluid flow path and support the plurality of flow path opening and closing members, respectively, and a catching projection that inhibits the plurality of flow path opening and closing members from sliding in the movement direction of the power piston,
wherein the plurality of flow path opening and closing members opens the fluid flow path by moving away from each other while sliding in the movement direction of the power piston by pressing force of the power piston, and when pressing force of the power piston is released, the plurality of flow path opening and closing members closes the fluid flow path by pressing force of the fluid between the plurality of flow path opening and closing members and the catching projection in a direction in which the fluid flow path is closed, and by elastic force of the elastic bodies.

15. The power generator of claim 14, wherein the power piston includes:
a first power piston which moves along the fluid flow path; and
a second power piston which moves along the fluid flow path while having a phase difference of 180 degrees with the first power piston.

* * * * *